United States Patent [19]

Dony et al.

[11] Patent Number: 4,871,149
[45] Date of Patent: Oct. 3, 1989

[54] LOCKABLE PNEUMATIC SPRING

[75] Inventors: Dominique Dony, Braillans; Andre Jaillet, Auxon Dessus, both of France

[73] Assignee: Airax, Montferrand le Chateau, France

[21] Appl. No.: 344,528

[22] Filed: Apr. 26, 1989

Related U.S. Application Data

[63] Continuation of Ser. No. 168,569, Mar. 7, 1988, abandoned, which is a continuation of Ser. No. 896,198, Aug. 14, 1986, abandoned.

[30] Foreign Application Priority Data

Aug. 28, 1985 [FR] France .................................. 85 12836

[51] Int. Cl.$^4$ .............................................. F16F 5/00
[52] U.S. Cl. ................................................ 267/64.12
[58] Field of Search ........... 297/355; 188/300; 322.14; 267/64.12; 251/321, 322, 323; 248/404, 631

[56] References Cited

U.S. PATENT DOCUMENTS

| | | | |
|---|---|---|---|
| 2,336,924 | 12/1943 | Cordis | 251/322 X |
| 3,024,067 | 3/1962 | Brandoli | 297/355 |
| 3,656,593 | 4/1972 | Bauer | 188/300 |
| 3,739,885 | 6/1973 | Bainbridge | 297/355 X |
| 3,913,901 | 10/1975 | Molders | 188/300 X |
| 4,093,196 | 6/1978 | Bauer | 188/300 X |
| 4,257,582 | 12/1975 | Wirges | 188/300 X |
| 4,445,671 | 5/1978 | Reuschenbach et al. | 267/64.12 |

*Primary Examiner*—Joseph Falk
*Attorney, Agent, or Firm*—Staas & Halsey

[57] ABSTRACT

A lockable pneumatic spring comprising a piston which slides in a cylinder filled with pressurized gas and which divides the cylinder into two different chambers which mutually communicate with each other through the intermediary of a slide valve. The slide valve includes a cylindrical first part which sealingly contacts a first annular seal element to form a lock seal between the chambers and a depressible cylindrical second part of constant diameter projecting outside the cylinder. The diameter of the first part is larger than the diameter of the second part and the two parts are connected by an intermediate part which tapers from the end of the first part to the end of the second part.

11 Claims, 3 Drawing Sheets

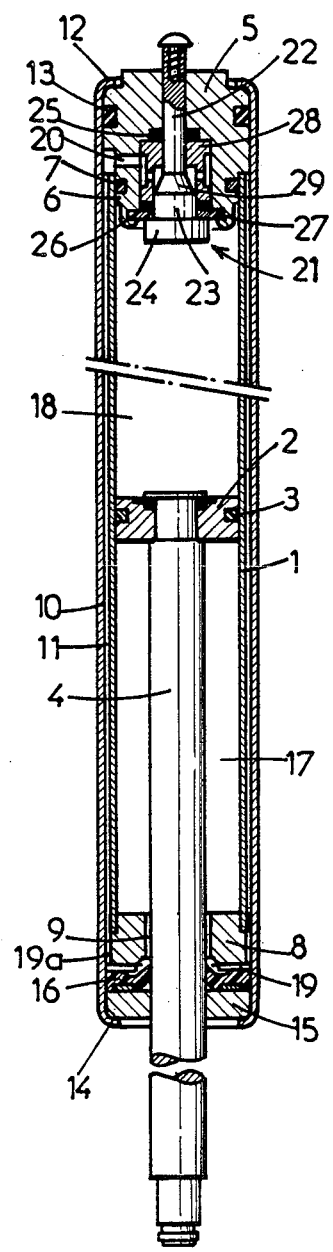
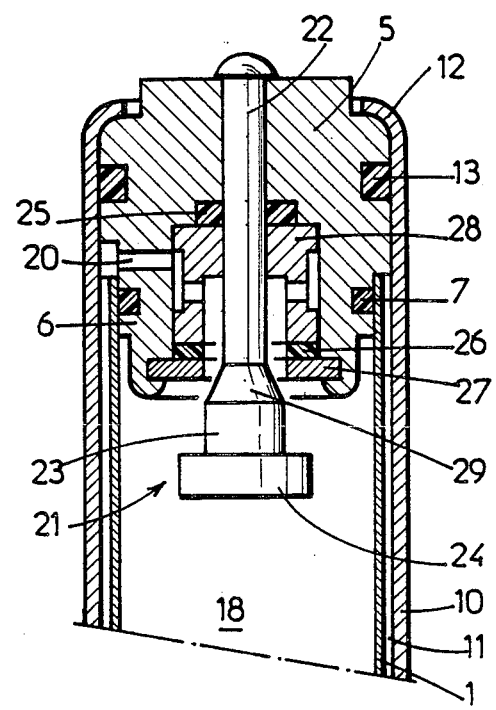

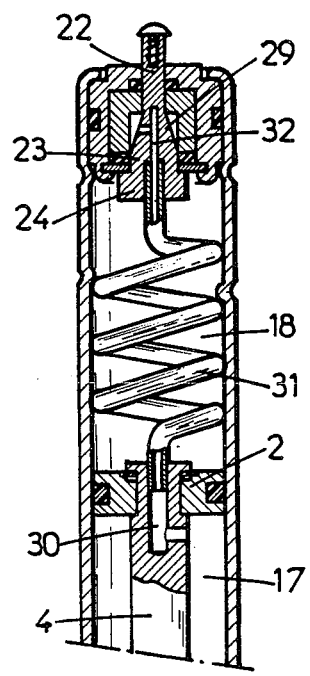
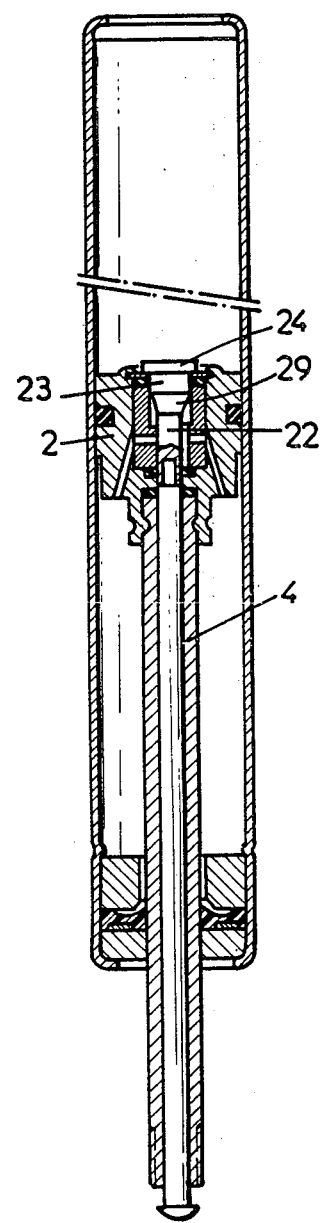

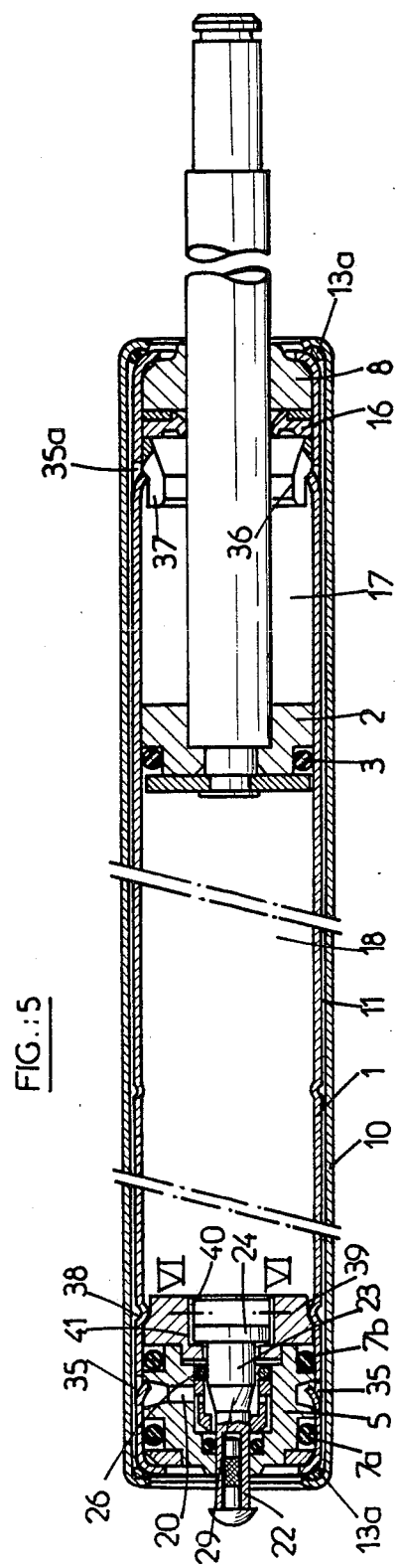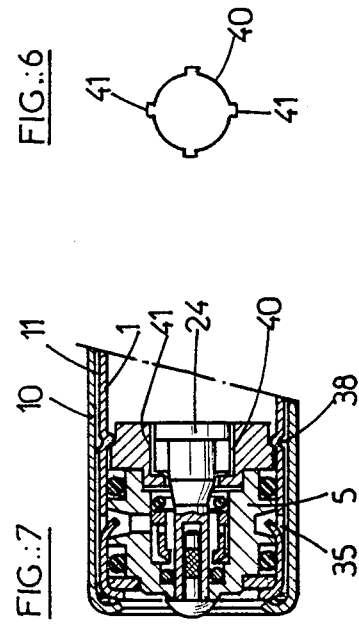

LOCKABLE PNEUMATIC SPRING

This is a continuation of co-pending application Ser. No. 168,569 filed on Mar. 7, 1988 which is a continuation of Ser. No. 896,198 filed on Aug. 14, 1986.

The present invention relates to pneumatic springs which are lockable in intermediate positions.

As known, these appliances comprise a piston sliding in a cylinder and dividing the latter into two chambers mutually isolated but capable of being made to communicate mutually by means of a maneuvrable valve in order to modify the position of the piston, the movement of the latter being locked when said communication is interrupted.

Devices of this type have already been used for adjusting the position of seats or their back-rests, tables, etc.

The communication between the two faces of the piston may be established in various ways. For example, in U.S. Pat. No. 3,407,909, which describes an apparatus filled with liquid or gas, it has already been proposed to realize this communication through the annular interval existing between the cylinder in which the piston moves and a second cylinder fitted concentrically with a slightly greater radius, both the cylinders being clinched on the endplates at their ends.

In this patent, the valve consists of two concentric parts, assembled for mutual rotation, and exhibiting ports which can be opened or closed by the relative rotation of the parts. Such an arrangement is not practical in certain cases, and particularly where the pneumatic spring is used in the base of a revolving seat.

It is known, from another quarter, to place the valve on that of the endplates of the cylinder which is opposite to the working part of the piston. A French Patent No. FR-A-1,453,681, for example, describes a valve formed by an axially movable cylindrical part terminated by a conical part, which cooperates with the edges of an axial duct, which act like the seat of a needle valve. The disadvantage of a needle valve, or flap valve, that is to say, of a valve in which fluid-tightness is obtained by the cooperation of two surfaces, one at least of which is conical or plane, is that a very slight relative displacement of the cooperating parts produces a change from opening to closure and vice versa. Means must therefore be provided to ensure with certainty that the valve is held in the desired condition, particularly the closed condition. These means tend to develop a substantial force, which may in time damage the sealing surfaces.

Another type of valve, so-called "slide" valves, is known, in which fluid-tightness is produced by the radial contact between a cylindrical surface and another surface which has a substantially equal diameter and which may likewise be cylindrical. The opening of the valve is produced by the fact that the diameter of one of the parts varies at the end of the cylindrical surface, to give place generally to a conical or plane surface, and this conical or plane surface then plays no part in producing fluid-tightness. In such valves, a substantial movement of the cylindrical surface has no important consequence, provided that the end of that cylindrical surface remains distant from the surface which cooperates with it, so that the holding means can tolerate substantial axial movements and therefore do not require a substantial force.

In French Patent No. FR-C-2,025,411, it was proposed to construct a valve of this type in the form of a rod adapted to slide through two endplates mutually opposite at one and the same end of the cylinder and leaving between them an interval where the communication between the two faces of the piston leads. These endplates are respectively equipped with channels to house seal elements cooperating with the rod, and the latter comprises between the seal elements an annular channel, the walls of which form a frustoconical flare outwards.

Such a construction of the valve has the disadvantage that if it is desired to produce it by a molding method or by cold heading, it is necessary to use a mold or a die in two parts, which leave a joint line which must be eliminated by machining.

The aim of the invention is to render the production of lockable pneumatic spring comprising a slide valve simpler and more economical.

One of its characteristics is that the rod forming a slide exhibits a cross-section, the variation of which is of constant sign in passing from one end to the other of the said rod, so that the latter, which has no channel, can be produced by extrusion or by molding or cold heading in a one-piece mold or die, which eliminates the necessity for an additional machining operation.

In its simplest embodiment, the rod or slide consists of two cylindrical parts of different diameters, mutually connected by an intermediate surface of frusto-conical shape, the small-diameter part projecting outwards for the operation of the rod, whereas the larger-diameter part cooperates with a seal element which, depending upon the position of the rod, either prevents the passage of the gas, when it is clamped on the large-diameter part, or else permits said passage when the small-diameter part of the rod comes level with this seal element.

Said seal element, and also a second seal element cooperating with the small-diameter part of the rod, are arranged in one and the same part forming the endplate common to both concentric cylinders, an annular distance piece being however provided between the seal elements to maintain them axially.

Another improvement is to clinch the two tubes one upon the other on the endplates of the appliance, with interposition of an appropriate seal element. In such an arrangement, it is the inner tube which mainly withstands the forces exerted by the pressure of the gas upon the endplates, and this tube is therefore made of high-strength steel, whereas the outer tube may be made of lower strength material.

According to another improvement, the large-diameter collar which terminates the slide rod towards the inside of the appliance is fitted in a cylindrical housing of a part integral with the corresponding endplate, thus obtaining additional guidance of the slide rod which improves the useful life of the appliance. To permit the passage of the gas, grooves are made in the cylindrical guide wall.

Further particulars of the invention will emerge from the description to be given below with reference to the accompanying drawing, given by way of example, wherein:

FIG. 1 illustrates the first embodiment of a lockable pneumatic spring, the valve being in the closed position;

FIG. 2 is a detailed view on a larger scale illustrating the valve in the open position;

FIGS. 3 and 4 show two variants;

FIG. 5 illustrates in longitudinal section another embodiment;

FIG. 6 is a partial section made along the line VI—VI of FIG. 5;

FIG. 7 illustrates the embodiment of FIG. 5 with the slide rod in the open position.

In the embodiment illustrated in FIGS. 1 and 2, the pneumatic spring comprises a first cylinder 1, in which a piston 2 can slide, being fitted with a seal element 3 and integral with a rod 4 which projects outside the appliance. At its end opposite the exit of the rod 4, the cylinder 1 is closed by a cylindrical endplate 5 equipped with a bearing surface 6 upon which the cylinder 1 is nested, an annular seal element 7 producing fluid-tightness of the nesting.

Opposite the endplate 5, the cylinder 1 is nested on a semi-endplate 8 which is penetrated by the rod 4, but which leaves around the rod a substantial play 9, the usefulness of which will be seen below.

Around the cylinder 1 there is a second cylinder 10, the internal radius of which is greater than the external radius of the cylinder 1, so that an interval 11 exists between the two cylinders.

This external cylinder is clinched at its end 12 on the endplate 5 with a seal element 13, and its other end 14 is likewise clinched on an endplate 15 which is penetrated by the rod 4 and which maintains between itself and the semi-endplate 8 a lip seal washer 16. This seal element, the lip of which presses against the rod 4, produces fluid-tightness of said rod according to an arrangement well known per se.

Since the piston 2 is fitted with the seal element 3, it divides two chambers 17 and 18 in the cylinder 1. These two chambers can communicate mutually only through the play 9, radial grooves 19 made in the semi-endplate 8, longitudinal grooves 19a in the semi-endplate 8, the interval 11 between the cylinders 1 and 10, the duct 20 cut in the endplate 5, and the slide 21 which will now be described. This slide comprises 3 cylindrical parts of different diameters 22, 23 and 24. The part 22 of relatively small diameter has the form of a rod which overhangs outside the appliance through the endplate 5 and which serves to operate the slide to open it. It penetrates a seal element 25. The larger-diameter part 23 cooperates with a seal element 26. Lastly, the part 24, having the form of a flat head, has a sufficiently large diameter to ensure that the valve will close when left to itself, by the effect of the pressure of the gas prevailing in the chamber 18, in spite of the counterpressure of the gas entering through the duct 20. A plate 27 embedded in the endplate 5 and penetrated by the part 23 of the valve bears against the seal element 26 when the valve is closed (position in FIG. 1). A tubular distance piece 28, which may be made of plastic for example and which is pierced with suitable channels for the passage of the gas, holds the seal elements 25, 26 at the correct spacing.

The cylindrical parts 22 and 23 of the slide are connected mutually by an intermediate part 29 of frustoconical or other general shape with a rectilinear profile, or concave or convex or even stepped.

It is clear from this description of the valve, that in passing from one of its ends to the other, the variations in its cross-section are of constant sign. For example, passing from its upper end to its lower end in FIG. 1, its cross-section is constant or increases.

The slide can therefore be obtained by extrusion, by molding, by injection molding for example, or by drop-forging or cold heading, with a one-piece mold or die, therefore leaving no line corresponding to a joint plane on the slide, so that a grinding machining operation becomes superfluous, which is a considerable advantage in reducing the cost price.

FIG. 2 shows the position of the valve when it has been opened by pressing on the outer end of the part 22.

A valve of a similar characteristic may be used in lockable springs having different constitutions from that which has just been described with reference to FIG. 1.

In FIG. 3, for example, in which only one of the ends of the pneumatic spring has been shown, the latter is of the single-cylinder type.

The chambers 17 and 18 separated by the piston 2 are mutually connected by the channel 30 pierced in the rod 4 and in the piston, and by the flexible helicoidal pipe 31 which leads to the channel 32 pierced in the valve. The latter again exhibits the cylindrical parts 22, 23 mutually connected by the frustoconical part 29, and 24.

In the variant according to FIG. 4, the valve is incorpoarted in the piston, and once again the three cylindrical parts 22, 23 and 24, and the frustoconical part 29 interposed between the parts 22 and 23, can be seen.

The part 22, forming the control rod as above, is placed inside the rod 4 of the piston 2, at the end of which it projects for operation.

In the embodiment illustrated in FIGS. 5 to 7, the tubes 1 and 10, which make the interval 11 between themselves, are clinched one upon the other on the endplates 5 and 8 of the appliance, with interposition of a sealing ring 13a which is crushed during the clinching. The inner tube 1 thus maintains the endplates 5 and 8 counter to the pressure of the gas, and it is constructed of high-strength steel, whereas the outer tube 10, which withstands only the force of the pressure of the gas in the annular interval 11, can be of lower strength steel. Ports, such as 35, made in the inner tube 1, enable the interval 11 to be placed in communication with the pipe 20 made in the endplate 5.

Other ports 35a provide communication between the interval 11 and the chamber 17. The lips of these ports also serve to hold in place a sleeve 36 applied against the resilient washer 16, of the lip seal element producing fluid-tightness on the piston rod 4. Longitudinal slots 37, made in the sleeve 36 level with the ports 35a, permit the passage of the gas. Local deformations 38 of the tube 1 serves to hold the endplate 5 in position. The latter is complemented by an annular part 39, of some thickness, which may be made of plastic and in which a cylindrical housing 40 is made to fit the large-diameter collar 24 of the slide rod. Thus this collar is guided in the housing 40 during the movements of the slide rod, the guidance of which is thus improved. The length of generatrix of the cylindrical housing 40 is sufficient so that, in the final open position of the slide rod, illustrated in FIG. 7, the collar 24 is still in the housing 40. Grooves 41 are made in the wall of the housing 40 for the passage of the gas.

It is self-evident that the embodiments described are not the only ones possible.

We claim:

1. A lockable pneumatic spring comprising:
   a cylinder containing pressurized gas;
   a piston slidably mounted in said cylinder and dividing said cylinder into first and second chambers; and
   a slide valve allowing mutual communication between the chambers, said slide valve having a one-piece movable slide having a cylindrical first part which sealingly contacts a first annular seal element to form a lock seal between said chambers, a depressible cylindrical second part of constant diameter projecting outside said cylinder, said lock seal being openable upon said second part being depressed, allowing exchange of pressurized gas between said chambers, a diameter of said first part being larger than a diameter of said second part, and an intermediate part for connecting said first and second parts, the intermediate part being tapered and adjoining the first part at a first end thereof and the second part at a second end thereof, the diameter of said intermediate part always being at least as large as the diameter of said second part and at most as large as the diameter of said first part.

2. A lockable pneumatic spring according to claim 1, wherein said second part is cylindrical and has a diameter smaller than said first part, and said intermediate part is of frustoconical shape, so that said slide valve maintains the same diameter or increases in diameter from the projecting end of said second part.

3. A lockable pneumatic spring according to claim 1, wherein said second part sealingly contacts a second annular seal for sealing said cylinder, and said lockable pneumatic spring further comprises a tubular distance piece arranged between said first and second annular seal elements for maintaining correct spacing between said seal elements.

4. A lockable pneumatic spring according to claim 1, further comprising an outer cylinder surrounding said cylinder, wherein said chambers communicate through said slide valve via an annular interval provided between said cylinder and said outer cylinder, said cylinder and said outer cylinder being inwardly curved at one end and fitted one upon the other on endplates and having a crushed third seal element between said cylinders.

5. A lockable pneumatic spring according to claim 4, wherein ports are provided in said cylinder for permitting the passage of the gas between said annular interval and said chambers.

6. A lockable pneumatic spring according to claim 4, wherein said endplates are held in place by local deformations in said cylinder.

7. A lockable pneumatic spring according to claim 2, further comprising a cylindrical housing for providing guidance to said slide valve, wherein said slide valve has a third part, extending from said first part, having a larger diameter than said first part, and is fitted in said cylindrical housing.

8. A lockable pneumatic spring according to claim 7, wherein a wall of said cylindrical housing has axial grooves for allowing passage of the gas.

9. A lockable pneumatic spring comprising:
a first cylinder containing pressurized gas;
a second cylinder surrounding said first cylinder leaving a first annular interval between said first and second cylinders;
a first cylindrical endplate having a bearing surface on which said first cylinder is nested, a first annular seal element for ensuring a fluid-tight nesting between said first cylinder and said bearing surface, and a second seal element between said second cylinder and said first endplate, said second cylinder being inwardly curved at one end and fitted on said first endplate;
a second endplate, said second cylinder being inwardly curved at its other end and fitted on said second endplate;
a third seal element adjacent to and inside of said second endplate for producing a fluid tight seal;
a piston slidably mounted in said first cylinder dividing said first cylinder into first and second chambers, said piston being fitted with a fourth seal element for forming a seal with the interior wall of said first cylinder for ensuring fluid-tight separation of said first and second chambers and integral with a rod, said rod extending through said third seal element and said second endplate and projecting outside said lockable pneumatic spring, said third seal element being fluid tight around said rod;
a semi-endplate adjacent to and inside of said third seal element for nesting said first cylinder, said semi-endplate being disc shaped and having a central passage open to said second chamber larger than said rod, said rod passing through the central passage, leaving a second annular interval between said rod and said semi-endplate for allowing passage of the gas; and
a slide valve for allowing mutual communication between said chambers, said slide valve having a one piece movable slide including a depressible cylindrical first part of constant diameter projecting outside said first endplate to outside said pneumatic spring, a cylindrical second part of a larger diameter than said first part which sealingly contacts a fifth annular seal element, placed adjacent to and inside of said first endplate, to form a locked seal between said chambers, said locked seal being openable upon said cylindrical first part being depressed from outside said pneumatic spring, allowing an exchange of pressurized gas between said chambers, a cylindrical third part extending from and of larger diameter than said second part for ensuring that said valve will be normally closed from pressure of the gas in the first chamber, and an intermediate part of frustoconical shape for connecting said first and second parts.

10. A lockable pneumatic spring according to claim 9 further comprising:
radial grooves in said semi-endplate connected to said second annular interval;
longitudinal grooves in said semi-endplate for connecting said radial grooves with said first annular interval;
a duct in said first endplate connecting said first annular interval to said slide valve, wherein said first and second chambers communicate by exchange of the gas through said duct, said first annular interval, said longitudinal grooves, said radial grooves, and said second annular interval when said slide valve is depressed.

11. A lockable pneumatic spring comprising:
a sealed cylinder containing pressurized gas;
a piston slidably mounted in said cylinder dividing said cylinder into a first chamber and a second chamber and having a first seal element for ensuring said piston is gas tight, said piston being integrally connected to a tubular rod, said tubular rod extending from said piston through said first chamber and a first end of said cylinder to outside of said lockable pneumatic spring; and
a slide valve incorporated in said piston, having a depressible, cylindrical first part of constant diameter which extends through said rod to the outside of said lockable pneumatic spring, a cylindrical second part of larger diameter than said first part, for cooperating with a second seal element for allowing communication of the gas in said first and second chambers upon depressing of said first part, and an intermediate part for connecting said first and second parts, the intermediate part being tapered and adjoining the first part at a first end thereof and the second part at a second end thereof, the diameter of said intermediate part always being at least as large as the diameter of said first part and at most as large as the diameter of said second part, a cylindrical third part having a larger diameter than said second part and extending from an end of said second part opposite said intermediate part for ensuring closure of said spring valve due to prevailing gas pressure in said second chamber when said first part is not depressed.

* * * * *